(12) United States Patent
Maekawa et al.

(10) Patent No.: US 12,066,645 B2
(45) Date of Patent: Aug. 20, 2024

(54) RETROREFLECTIVE SHEET

(71) Applicant: Kiwa Chemical Industry Co., Ltd., Wakayama (JP)

(72) Inventors: Ippei Maekawa, Wakayama (JP); Yukihiro Maeda, Wakayama (JP)

(73) Assignee: Kiwa Chemical Industry Co., Ltd., Wakayama (JP)

( * ) Notice: Subject to any disclaimer, the term of this patent is extended or adjusted under 35 U.S.C. 154(b) by 519 days.

(21) Appl. No.: 17/601,645

(22) PCT Filed: Oct. 28, 2020

(86) PCT No.: PCT/JP2020/040448
§ 371 (c)(1),
(2) Date: Oct. 5, 2021

(87) PCT Pub. No.: WO2021/085478
PCT Pub. Date: May 6, 2021

(65) Prior Publication Data
US 2022/0155501 A1     May 19, 2022

(30) Foreign Application Priority Data
Oct. 30, 2019 (JP) .................... 2019-197594

(51) Int. Cl.
*G02B 5/12*      (2006.01)
*B05D 7/00*      (2006.01)
(Continued)

(52) U.S. Cl.
CPC ............. *G02B 5/128* (2013.01); *B05D 7/584* (2013.01); *B60R 13/10* (2013.01); *E01F 9/619* (2016.02); *G09F 13/16* (2013.01)

(58) Field of Classification Search
CPC . G02B 5/128; G02B 5/12; G02B 1/04; B05D 7/584; B60R 13/10; E01F 9/619;
(Continued)

(56) References Cited

U.S. PATENT DOCUMENTS 5,069,964 A    12/1991    Tolliver et al.
5,393,590 A    2/1995    Caspari
(Continued)

FOREIGN PATENT DOCUMENTS

CN    206411287 U    8/2017
EP    0 672 921    9/1995
(Continued)

OTHER PUBLICATIONS

Office Action issued in Japanese Patent Application No. 2021-505946, mailed May 20, 2021, 4 pages w/translation.
(Continued)

*Primary Examiner* — Euncha P Cherry
(74) *Attorney, Agent, or Firm* — HSML P.C.

(57) ABSTRACT

A retroreflective sheet 9 of the present invention includes; a surface layer 1; a glass bead holding layer 5 containing glass beads 3 that are located randomly as viewed cross-sectionally; and a metal reflective layer 4 on a back surface side of the glass bead holding layer 5. The surface layer 1 is a vinyl chloride resin layer. The retroreflective sheet further includes, between the vinyl chloride resin layer and the glass bead holding layer, a barrier layer 2 for preventing deterioration of the metal reflective layer. The barrier layer 2 is preferably an alkyd-melamine resin layer. Thereby, it is possible to provide a retroreflective sheet that can prevent the degradation of, e.g., the reflective function of the metal reflective layer on the back surface side of the glass bead
(Continued)

holding layer and thus maintaining high weather resistance and wide-angle reflectivity, and that can exhibit high surface printability.

20 Claims, 7 Drawing Sheets

(51) Int. Cl.
  *B60R 13/10* (2006.01)
  *E01F 9/619* (2016.01)
  *G02B 5/128* (2006.01)
  *G09F 13/16* (2006.01)
(58) Field of Classification Search
  CPC ......... G09F 13/16; B32B 27/30; B32B 7/023; B32B 27/20; B32B 27/304; B32B 27/42
  See application file for complete search history.

(56) References Cited

U.S. PATENT DOCUMENTS

| | | |
|---|---|---|
| 5,601,915 A | 2/1997 | Ochi et al. |
| 5,882,771 A | 3/1999 | Klein et al. |
| 6,726,982 B2 | 4/2004 | Christian et al. |
| 2002/0142121 A1 | 10/2002 | Hingsen-Gehrmann et al. |
| 2006/0256439 A1 | 11/2006 | Yukawa et al. |
| 2012/0200709 A1 | 8/2012 | Nakajima et al. |
| 2015/0321452 A1 | 11/2015 | Egashira |
| 2019/0061326 A1 | 2/2019 | Alessandro et al. |
| 2019/0079222 A1* | 3/2019 | Shiomi .................. G02B 5/124 |
| 2019/0144657 A1 | 5/2019 | Henderson et al. |

FOREIGN PATENT DOCUMENTS

| | | |
|---|---|---|
| EP | 1 659 425 | 5/2006 |
| JP | 8-512253 | 12/1996 |
| JP | 11-129409 | 5/1999 |
| JP | 11-183715 | 7/1999 |
| JP | 2960478 B | 10/1999 |
| JP | 2000-508434 | 7/2000 |
| JP | 2002-178648 | 6/2002 |
| JP | 2003-344624 | 12/2003 |
| JP | 2004-519722 | 7/2004 |
| JP | 2005-292805 | 10/2005 |
| JP | 4849879 | 1/2012 |
| JP | 2013-508748 | 3/2013 |
| JP | 2014-124940 | 7/2014 |
| JP | 2016-215672 | 12/2016 |
| JP | 2017-177481 | 10/2017 |
| JP | 3216375 U | 5/2018 |
| JP | 2018-094923 | 6/2018 |
| JP | 6598343 | 10/2019 |
| KR | 10-0740753 | 7/2007 |
| WO | 97/38336 | 10/1997 |
| WO | 2019/131496 | 7/2019 |

OTHER PUBLICATIONS

International Search Report issued in International Application No. PCT/JP2020/040448, Jan. 19, 2021, 4 pages.
Extended European Search Report issued in corresponding European Patent Application No. 20882850.9, Jun. 27, 2022, 7 pages.
First Office Action issued in the corresponding Korean Patent Application No. 10-2021-7032483, Jul. 26, 2023, 12 pages w/translation.

* cited by examiner

RETROREFLECTIVE SHEET

TECHNICAL FIELD

The present invention relates to a retroreflective sheet (regular reflection sheet) suitable for vehicle license plates, various kinds of signs such as road signs, traffic signs and guide signs, advertising boards, fleet marking, and the like.

BACKGROUND ART

Japanese vehicle license plates are usually produced by embossing a white-painted aluminum plate to form convex portions with the shape of, e.g., a regional name and numbers, and printing a colored layer on the convex portions using, e.g., a green ink. Internationally, license plates are produced using retroreflective sheets, etc. Such vehicle license plates are formed by stacking a retroreflective sheet on a base plate. The retroreflective sheets stacked on base plates also are used for traditional road signs and traffic signs, guide signs, advertising boards, and fleet marking for promotional activities by wrapping a retroreflective sheet with an advertisement around a vehicle and driving the vehicle around the city Patent Document 1 proposes a retroreflective sheet including: retroreflective elements arranged in a monolayer; a spacing layer in which the retroreflective elements are at least partially embedded; a specularly reflecting layer underlying the spacing layer; and a bead bond layer in which the retroreflective elements are at least partially embedded. The bead bond layer includes an aminoplast-crosslinked polymer containing urethane groups. The polymer has a glass transition temperature (Tg) of about less than 0° C. before crosslinking, and a top film as a surface layer contains vinyl acetate and a methacrylic acid polymer for example. Patent Document 2 proposes a sheet for a license plate including a base film layer and a pressure-sensitive adhesive layer. The base film layer is a polyvinyl chloride film with a thickness of 60 μm or more, the pressure-sensitive adhesive layer contains an acrylic polymer for example, and a surface protective layer contains transparent polyurethane for example. The surface protective layer for protecting the graphic printed layer is attached via the adhesive layer after graphic printing. Patent Document 3, which is filed by the present applicant, relates to a retroreflective sheet in which glass beads contained in a polyvinyl acetal resin layer are located randomly in the thickness direction. Patent Document 4, which is also filed by the present applicant, relates to a graphic sheet including a surface layer containing a polycarbonate urethane resin, a partially printed layer under the surface layer, and an ink undercoat layer containing an alkyd-melamine resin.

PRIOR ART DOCUMENTS

Patent Documents

Patent Document 1: JP 2000-508434A
Patent Document 2: JP 2016-215672 A
Patent Document 3: JP 2005-292805A
Patent Document 4: JP 6598343

DISCLOSURE OF INVENTION

Problem to be Solved by the Invention

The retroreflective sheet based on Patent Document 3 of the conventional technique has wide-angle reflective performance capable of widening an incidence angle and an observation angle, but the surface printing quality is not satisfactory because polyurethane is used for the surface layer. If vinyl chloride resin is used for the surface layer, high wide-angle reflectivity is obtained when glass beads are located randomly, but the reflective function of the metal reflective layer located on the back surface side of the glass bead holding layer degrades after a long period of use, and the weather resistance degrades. Such randomly-located glass beads are more susceptible to the vinyl chloride resin layer.

To solve the above conventional problems, the present invention provides a retroreflective sheet that can prevent degradation of, e.g., the reflective function of the metal reflective layer located on the back surface side of the glass bead holding layer and thus maintaining high weather resistance and high wide-angle reflectivity, and that can exhibit high surface printability.

Means for Solving Problem

A retroreflective sheet of the present invention is a retroreflective sheet including: a surface layer; a glass bead holding layer containing glass beads that are located randomly as viewed cross-sectionally; and a metal reflective layer on a back surface side of the glass bead holding layer. The surface layer is a vinyl chloride resin layer. The retroreflective sheet further includes, between the vinyl chloride resin layer and the glass bead holding layer, a barrier layer for preventing degradation of the reflective function of the metal reflective layer.

Effects of the Invention

In the present invention, the surface layer is a vinyl chloride resin layer, and the barrier layer for preventing deterioration of the metal reflective layer is disposed between the vinyl chloride resin layer and the glass bead holding layer. Thereby, reflectance and high weather resistance are maintained, the layer thickness is increased by the barrier layer, and the deterioration of the metal reflective layer due to the vinyl chloride resin layer can be avoided further. Moreover, since the surface layer is a vinyl chloride resin layer, a retroreflective sheet with high surface printability is produced. Further, since the glass beads are located randomly as viewed cross-sectionally, a retroreflective sheet with high wide-angle reflectivity is produced.

DESCRIPTION OF THE INVENTION

In the case of using the retroreflective sheet as a sheet for a vehicle license plate, predetermined symbols such as an area code and numbers are printed for individual vehicles. Thermal transfer printing is suitable for the printing. The thermal transfer printing is preferably performed at a temperature ranging from 120° C. to 200° C., and the outer surface layer of the retroreflective sheet is preferably a vinyl chloride resin that can withstand the above range of temperatures while having good printability. The vinyl chloride resin, however, deteriorates the metal reflective layer after a long period of use and lowers the reflectivity. The reason for this is considered to be that the vinyl chloride resin decomposes with sunlight and moisture and generates metal corrosive substances.

Figure 12A:
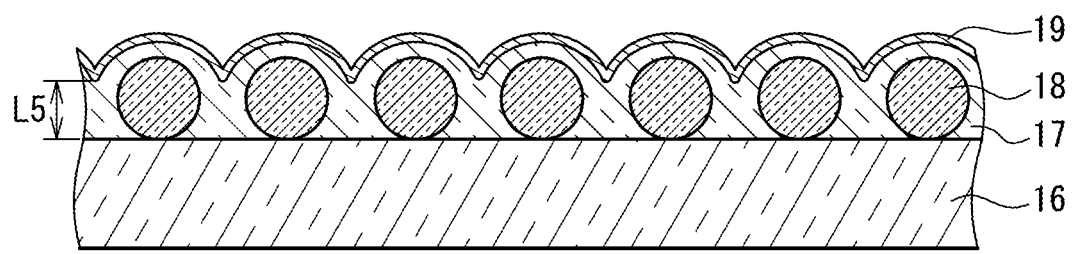
FIG. 12A is a schematic partial cross-sectional view of a retroreflective sheet in which glass beads are arrayed in a row.
Figure 12B:
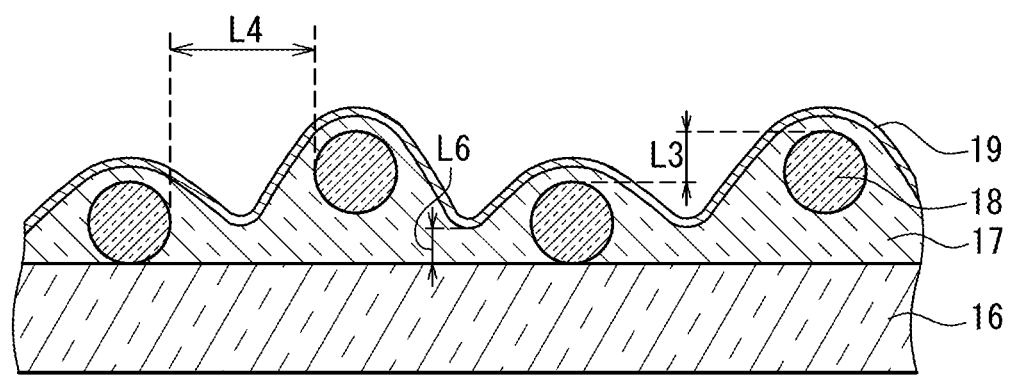
FIG. 12B is a schematic partial cross-sectional view of a retroreflective sheet in which glass beads are located randomly.

Reflective sheets in which glass beads are located randomly are more susceptible to the deterioration of the vinyl chloride resin layer with sunlight and moisture than those in which glass beads are arrayed uniformly. The following describes the details with reference to the drawings. FIG. 12A is a schematic partial cross-sectional view of a retroreflective sheet in which glass beads are arrayed in a row (dispersion type). In the reflective sheet, a distance L5 between a surface layer 16 and a portion of a metal reflective layer 19 closest to the surface layer 16 is uniform. On the other hand, in a retroreflective sheet of FIG. 12B in which glass beads are located randomly, a lengthwise interval L3 and a lateral interval L4 between glass beads 18 are not uniform, and some of the lateral intervals are long. There are many portions where a distance L6 between the surface layer 16 and the metal reflective layer 19 is short. In other words, the sheet includes portions of L6<L5. Therefore, in the case of using a vinyl chloride layer as the surface layer 16, the configuration in which the glass beads are located randomly is more susceptible to the deterioration from the vinyl chloride layer than the configuration in which glass beads are arrayed uniformly, and hence the weather resistance is more easily degraded.

To cope with this, by including the barrier layer for preventing the deterioration of the metal reflective layer between the vinyl chloride resin layer and the glass bead holding layer, the layer thickness increases, and thereby the retroreflective sheet of the present invention can achieve both of high surface printability and high weather resistance for maintaining the reflective properties for a long period of time.

The vinyl chloride resin to be used in the surface layer is polyvinyl chloride or a copolymer of a vinyl chloride monomer and a monomer copolymerizable therewith. Examples of the copolymer include a vinyl chloride-vinyl acetate copolymer, a vinyl chloride-acrylic acid copolymer, a vinyl chloride-methacrylic acid copolymer, a vinyl chloride-methyl methacrylate copolymer, a vinyl chloride-ethyl methacrylate copolymer, a vinyl chloride-ethylene copolymer, a vinyl chloride-styrene copolymer, and a vinyl chloride-vinylidene chloride copolymer. Mixtures of two or more of the above polymers can also be used.

It is preferred that the barrier layer includes a composition containing; a resin component containing at least one of alkyd resin, polyester resin, polyurethane resin, vinyl resin, acrylic resin having a reactive functional group, or the like; and at least one of a curing agent or a curing catalyst containing at least one of amino resin, epoxy resin, polyisocyanate, or blocked polyisocyanate. Among them, an alkyd-melamine resin layer, which is a reactant of alkyd resin and melamine resin (one of the amino resins), is particularly preferred because it has a high barrier effect and is highly adhesive with the vinyl chloride resin layer and the glass bead holding layer located on its both surfaces.

The composition of the surface layer and the composition of the barrier layer may contain an ultraviolet absorber, a heat stabilizer, a light stabilizer, an antioxidant, and the like, as needed, which are added individually or in combination. A retroreflective sheet containing the above can further improve the long term durability As the ultraviolet absorber, known absorbers can be used, and typical examples thereof include benzophenones, benzotriazoles, cyanoacrylates, benzoates, salicylates, oxalic anilides, and triazines.

The heat stabilizer captures and neutralizes hydrogen chloride generated from the polyvinyl chloride by heat or the like to maintain the stability of resin. Examples of the heat stabilizer include leads, organotins, metallic soaps, and epoxy compounds.

As the light stabilizer, known stabilizers can be used, and examples thereof include hindered amines.

As the antioxidant, known antioxidants can be used, and examples thereof include hindered phenols, phosphites, and sulfurs.

The use of the ultraviolet absorber, heat stabilizer, light stabilizer and antioxidant based on low molecular compounds may cause separation from the resin layer, i.e., bleedout, and therefore the use of high molecular weight type additives is further preferred.

The composition of the surface layer and the composition of the barrier layer may contain a plasticizer and a printing additive as needed. By including the above, it is possible to improve the physical properties of the layers and the performance as the surface layer subjected to printing.

Examples of the plasticizer include phthalic acids, aliphatic dibasic type, phosphoric acids, and polyesters.

The barrier layer has a thickness of preferably 20 µm or more, and more preferably 20 µm to 60 µm. Within the above range, the barrier effect can be satisfactorily exhibited.

The vinyl chloride resin layer has a thickness of preferably 10 µm or more, and more preferably 10 µm to 60 µm. Within the above range, the printability can be satisfactorily high.

The total thickness of the vinyl chloride resin layer and the barrier layer is preferably 30 μm to 120 μm, and more preferably 40 μm to 100 μm. Within the above range, the weather resistance, printability and embossing properties can be satisfactorily high.

It is preferred that the vinyl chloride resin layer has heat resistance that can withstand a thermal transfer printing temperature ranging from 120° C. to 200° C. Within the above range of temperatures, the vinyl chloride resin layer can withstand the thermal transfer printing, and deformation and deterioration by hot embossing can be avoided.

At least one of the vinyl chloride resin layer or the barrier layer may be colored. The coloring may be partial or full-surface coloring. To maintain transparency so as not to hinder reflectivity, transparent coloring is desirable. The color tone is, e.g., white, green, yellow, red, blue, purple, and black. For the vehicle license plates, color can be selected depending on the vehicle type, country, region, etc.

A printed layer may be disposed between the vinyl chloride resin layer and the barrier layer. The printed layer may have any pattern. The print layer is suitable when the retroreflective sheet is used as a graphic sheet. The printed layer is preferably formed by ink jet printing, gravure printing, screen printing or offset printing, and more preferably by gravure printing. The printed layer may be a partially printed layer or a fully printed layer.

It is preferred that the retroreflective sheet has a brightness retention rate of 80% or more according to a 2000-hour light resistance test of an ultraviolet fluorescent lamp accelerated weathering test. With this configuration, the retroreflective sheet can maintain the reflective properties for a long period of time, so that weather resistance is improved.

It is preferred that the retroreflective sheet further includes a protective film on an outer surface of the surface layer, and an adhesive layer below the glass bead holding layer and a release film or release paper on an outer surface of the adhesive layer. This facilitates the transportation and attachment of the retroreflective sheet.

The retroreflective sheet is suitable for vehicle license plates, graphic sheets, road signs, traffic signs, guide signs, advertising boards, and fleet marking, for example. Particularly, the retroreflective sheet is suitable as a sheet for a vehicle license plate.

The following describes resins for the respective layers.

(1) Surface Layer

Vinyl chloride resin is used for the surface layer. Any vinyl chloride resin layer having heat resistance that can withstand a thermal transfer printing temperature of 120° C. to 200° C. may be used.

(2) Barrier Layer

As the barrier layer, a composition can be used that contains: a resin component containing at least one of alkyd resin, polyester resin, polyurethane resin, vinyl resin, acrylic resin having a reactive functional group, or the like; and at least one of a curing agent or a curing catalyst containing at least one of amino resin, epoxy resin, polyisocyanate, or blocked polyisocyanate.

The alkyd resin is a synthetic resin formed by condensation polymerization between polybasic acid or fatty acid (or fatty oil) and polyhydric alcohol. Examples of the polybasic acid include phthalic acid, phthalic anhydride, isophthalic acid, terephthalic acid, tetrahydrophthalic anhydride, hexahydrophthalic anhydride, trimellitic acid, trimellitic anhydride, pyromellitic acid, succinic acid, adipic acid, sebacic acid, and benzoic acid. Examples of the fatty acid include soybean oil, coconut oil, linseed oil, castor oil, dehydrated castor oil, safflower oil, tall oil, and palm kernel oil. Examples of the polyhydric alcohol include ethylene glycol, propylene glycol, 1,3-butylene glycol, 1,6-hexanediol, trimethylolethane, trimethylolpropane, and glycerin.

Alkyd resins formed from the above raw materials may be modified with resins such as acrylic resin, urethane resin, epoxy resin, phenol resin, and silicon resin.

Examples of commercially available alkyd resins include "BECKOLITE" series manufactured by DIC CORPORATION and "AMILAC" series manufactured by Kansai Paint Co., Ltd.

The polyurethane resin is a high molecular compound with a urethane bond and formed, for example, by reaction between polyisocyanate and polyol. Examples of the polyisocyanate include: aliphatic polyisocyanates such as methylene diisocyanate, hexamethylene diisocyanate and trimethylhexamethylene diisocyanate; alicyclic polyisocyanates such as cyclohexane diisocyanate and isophorone diisocyanate; aromatic polyisocyanates such as toluene diisocyanate and methylenebisphenyl diisocyanate; adducts, biurets and isocyanurates of the polyisocyanates; blocked isocyanates in which the isocyanate group of the polyisocyanates is protected with a blocking agent; and modified products of the polyisocyanates. Examples of the modified products of the polyisocyanates include polyisocyanate modified products obtained by modifying the isocyanate compounds with allophanate bond, urea bond, uretdione bond, carbodiimide bond or the like. Examples of the polyol include polycarbonate polyols, polyether polyols and polyester polyols, and urethane resins synthesized therefrom are respectively called polycarbonate urethane resin, polyether urethane resin, and polyester urethane resin.

The vinyl resin is a synthetic resin formed by polymerization of a monomer having a vinyl group. Examples of the vinyl resin include vinyl chloride resin and polyvinyl acetal resin. The vinyl chloride resin is a high molecular compound formed by polymerization of a vinyl chloride monomer, and a derivative thereof. The vinyl chloride monomer may be used alone, or may be copolymerized with other monomers such as ethylene, vinyl acetate, acrylic acid, and methacrylic acid. Examples of commercially available vinyl chloride resins include "SOLBIN" series (vinyl chloride-vinyl acetate copolymer resin) manufactured by Nissin Chemical Industry Co., Ltd. The polyvinyl acetal resin can be formed by acetalization of polyvinyl alcohol resin with aldehyde.

The acrylic resin is a high molecular compound formed by polymerization of an acrylic monomer, and a derivative thereof. Examples of the acrylic monomer include acrylic acid derivatives and methacrylic acid derivatives such as methyl acrylate, ethyl acrylate, methyl methacrylate, 2-hydroxyethyl acrylate and methoxybutyl acrylate, and acrylic acid and methacrylic acid. The acrylic monomer may be used alone or used in combination of two or more. The acrylic monomer may also be copolymerized with other monomers such as styrene, butadiene, and vinyl acetate. Examples of commercially available acrylic resins include "ACRYDIC" series manufactured by DIC CORPORATION.

Examples of the acrylic resin having a reactive functional group include polymers and copolymers of acrylic vinyl monomers having an alkyl group, a hydroxyl group, an epoxy group, an alkoxy group, a phenoxy group, an oxyethylene group, an amino group, an amide group, a carboxyl group, a halogen atom, a phosphate group, a sulfonic group, a urethane group, a phenyl group, a benzyl group, a tetrahydrofurfuryl group or the like, and copolymers of acrylic vinyl monomers and other monomers copolymerizable therewith.

Examples of the acrylic vinyl monomer having an alkyl group include methyl(meth)acrylate, ethyl(meth)acrylate, isopropyl(meth)acrylate, lauryl(meth)acrylate, stearyl(meth)acrylate, butyl(meth)acrylate, hexyl(meth)acrylate, cyclohexyl(meth)acrylate, 2-ethylhexyl(meth)acrylate, isoamyl(meth)acrylate, isooctyl(meth)acrylate, n-octyl(meth)acrylate, dodecyl(meth)acrylate, and isobutyl(meth)acrylate.

Examples of the acrylic vinyl monomer having a hydroxyl group include 2-hydroxyethyl(meth)acrylate, 2-hydroxypropyl(meth)acrylate, 2-hydroxybutyl(meth)acrylate, and 3-chloro-2-hydroxypropyl(meth)acrylate.

Examples of the acrylic vinyl monomer having an epoxy group include glycidyl(meth)acrylate and methylglycidyl(meth)acrylate.

Examples of the acrylic vinyl monomer having an alkoxy group include methoxyethyl(meth)acrylate, ethoxyethyl(meth)acrylate, and butoxyethyl(meth)acrylate.

An example of the acrylic vinyl monomer having a phenoxy group is phenoxyethyl(meth)acrylate.

Examples of the acrylic vinyl monomer having an oxyethylene group include diethyleneglycol(meth)acrylate, methoxydiethyleneglycol(meth)acrylate, methoxypolyethyleneglycol(meth)acrylate, phenoxydiethyleneglycol(meth)acrylate, and phenoxypolyethyleneglycol(meth)acrylate.

Examples of the acrylic vinyl monomer having an amino group include dimethylaminoethyl(meth)acrylate, diethylaminoethyl(meth)acrylate, N-tert-butylaminoethyl(meth)acrylate, and methacryloyloxyethyltrimethylammoniumchloride(meth)acrylate.

Examples of the acrylic vinyl monomer having an amide group include (meth)acrylamide, N-methylol(meth)acrylamide, N-methoxymethyl(meth)acrylamide, and N,N'-methylenebis(meth)acrylamide.

Examples of the acrylic vinyl monomer having a carboxyl group include acrylic acid, methacrylic acid, 2-methacryloyloxy succinic acid, 2-methacryloyloxyethyl maleic acid, 2-methacryloyloxyethylphthalic acid, and 2-methacryloyloxyethylhexahydrophthalic acid.

Examples of the acrylic vinyl monomer having a halogen atom include trifluoroethyl(meth)acrylate, pentadecafluorooxyethyl(meth)acrylate, 2-chloroethyl(meth)acrylate, 2,3-dibromopropyl(meth)acrylate, and tribromophenyl(meth)acrylate.

Examples of the acrylic vinyl monomer having a phosphate group include 2-methacryloyloxyethyldiphenylphosphate(meth)acrylate, trimethacryloyloxyethylphosphate(meth)acrylate, and triacryloyloxyethylphosphate(meth)acrylate.

Examples of the acrylic vinyl monomer having a sulfonic group include sodium sulfopropyl(meth)acrylate, sodium 2-sulfoethyl(meth)acrylate, and sodium 2-acrylamide-2-methylpropanesulphonate.

An example of the acrylic vinyl monomer having a urethane group is urethane(meth)acrylate.

Examples of the acrylic vinyl monomer having a phenyl group include phenyl(meth)acrylate, p-tert-butylphenyl(meth)acrylate, and o-biphenyl(meth)acrylate.

An example of the acrylic vinyl monomer having a benzyl group is benzyl (meth)acrylate.

An example of the acrylic vinyl monomer having a tetrahydrofurfuryl group is tetrahydrofurfuryl(meth)acrylate.

Examples of the other monomers copolymerizable therewith include vinyl monomers having a silane group, styrene, chlorostyrene, α-methylstyrene, vinyltoluene, vinyl chloride, vinyl acetate, vinyl propionate, VEOVA 10 (vinyl alkylate compound manufactured by Shell Chemicals Limited), acrylonitrile, and vinyl pyridine.

Examples of the vinyl monomer having a silane group include vinyltrimethoxysilane, vinyltriethoxysilane, vinyltris(β-methoxyethyl)silane, vinyltriacetylsilane, and methacryloyloxypropyltrimethoxysilane.

In addition, examples of the other monomers copolymerizable therewith include ethyleneglycoldi(meth)acrylate, diethyleneglycoldi(meth)acrylate, triethyleneglycoldi(meth)acrylate, dipropyleneglycoldi(meth)acrylate, 1,3-butyleneglycoldi(meth)acrylate, trimethylolpropanetri(meth)acrylate, tetramethylolmethanetetra(meth)acrylate, divinylbenzene, N,N'-methylenebisacrylamide, 1,4-buthanedioldi(meth)acrylate, and 1,6-hexanedioldi(meth)acrylate. These monomers can be used in a range that does not hinder the coating suitability.

The amino resin is a resin formed by subjecting formaldehyde and amino compounds such as melamine, benzoguanamine and urea to an addition-condensation reaction and etherifying the reactant with aliphatic monohydric alcohol. Examples of the amino resin include melamine resin, benzoguanamine resin, and urea resin. It is particularly preferable to use an alkyd-melamine resin, which is a reactant of alkyd resin and melamine resin (one of the amino resins). The melamine resin used as the curing resin component is typically formed by subjecting melamine and formaldehyde to an addition-condensation reaction and etherifying the reactant with aliphatic monohydric alcohol (e.g., methanol, butanol). Examples of commercially available amino resins include "AMIDIR" series manufactured by DIC CORPORATION.

The epoxy resin is a compound containing two or more epoxy groups in one molecule. Examples of the epoxy resin include: aliphatic epoxy resins including glycidyl-etherified products of aliphatic polyhydric alcohols such as ethylene glycol, glycerin, trimethylolpropane and polyethylene glycol, and glycidyl-esterified products of aliphatic polycarboxylic acids such as malonic acid, succinic acid, adipic acid and 1,2,3,4-butanetetracarboxylic acid; alicyclic epoxy resins such as bis(2,3-epoxycyclopentyl) ether, 3,4-epoxycyclohexylmethyl-3',4'-epoxycyclohexanecarboxylate, bis(3,4-epoxycyclohexylmethyl) adipate and limonene dioxide; and aromatic epoxy resins including glycidyl-etherified products of aromatic polyhydric alcohols such as bisphenol A, bisphenol F, bisphenol AD and novolac, and glycidyl-esterified products of aromatic polycarboxylic acids such as phthalic acid, 1,4-naphthalenedicarboxylic acid, trimellitic acid and pyromellitic acid. As the epoxy resin, aliphatic and alicyclic epoxy resins are preferred. Examples of commercially available epoxy resins include "EPICLON" series manufactured by DIC CORPORATION, "TETRAD" series manufactured by MITSUBISHI GAS CHEMICAL COMPANY, INC., and "ADEKA RESIN EP" series manufactured by ADEKA CORPORATION.

The polyisocyanate is a compound containing two or more isocyanate groups in one molecule. Examples of the polyisocyanate include: aliphatic polyisocyanates such as methylene diisocyanate, hexamethylene diisocyanate, and trimethylhexamethylene diisocyanate; alicyclic polyisocyanates such as cyclohexane diisocyanate and isophorone diisocyanate; aromatic polyisocyanates such as toluene diisocyanate and methylenebisphenyl diisocyanate; adducts, biurets and isocyanurates of the polyisocyanates; blocked isocyanates in which the isocyanate group of the polyisocyanates is protected with a blocking agent; and modified products of the polyisocyanates. Examples of the modified products of the polyisocyanates include polyisocyanate modified products obtained by modifying the isocyanate compounds with allophanate bond, urea bond, uretdione bond or the like. As the polyisocyanate, aliphatic and alicyclic polyisocyanates are preferred. Examples of commercially available isocyanates include "BURNOCK" series manufactured by DIC CORPORATION, "Coronate" series manufactured by TOSOH CORPORATION, and "DURANATE" series manufactured by Asahi Kasei Corporation.

(3) Glass Bead Holding Layer

As the resin that can be used as the glass bead holding layer, those containing as a base polymer component polyurethane resin, polyvinyl acetal resin, acrylic resin, polyester resin or the like can be used, and they are preferably blended with a curing agent such as amino resin, epoxy resin, polyisocyanate or blocked polyisocyanate to use them as a heat-curing type. Among them, polyvinyl acetal resin is preferred, because it is colorless and transparent, has excellent pigment dispersibility, excellent adhesion to titanium oxide glass, excellent toughness, excellent flexibility and good solubility in organic solvents, has functional groups, and can undergo a crosslinking reaction.

(4) Metal Reflective Layer

The metal reflective layer can be formed from metals described below. The thickness is 5 to 200 nm, and preferably 10 to 100 nm, although it changes depending on the metal used. If the thickness of the metal reflective layer is less than 5 nm, the concealing property of the metal reflective layer is not sufficient, and hence the layer cannot achieve the object as the reflective layer. If the thickness of the metal reflective layer exceeds 200 nm, the metal reflective layer cracks easily, and the cost is increased, and hence such a thickness is not preferable. A method for forming the metal reflective layer is not particularly limited, and typical methods are available such as evaporation, sputtering, transferring, and a plasma method. Among them, evaporation and sputtering are preferred in terms of the workability.

The metal for forming the metal reflective layer is also not particularly limited. Examples of the metal include aluminum, gold, silver, copper, nickel, chromium, magnesium, titanium, palladium, cobalt, rhodium, niobium, zinc, tin, alloys containing these metals or those having excellent light reflectance such as titanium oxide and titanium nitride. Among them, in terms of the workability and the easy formation of the metal reflective layer, the durability of light reflective efficiency and the like, aluminum, chromium and nickel are particularly preferred. The metal reflective layer may be formed using an alloy including two or more kinds of metals.

(5) Adhesive Layer

The adhesive layer may contain resins such as acrylic resin and rubber resin (e.g., natural rubber, synthetic rubber), preferably acrylic resin. The acrylic resin has high tackiness and high weather resistance.

The acrylic resin is preferably a polymer acrylic resin containing as a main component at least one of an acrylic acid ester copolymer or an acrylic prepolymer, or a modified acrylic resin that is obtained by adding, to the above polymer acrylic resin, a tackifier and a monomer for imparting a cohesive power.

The adhesive layer may be colored in any color. Exemplary colors include white, green, yellow, red, blue, purple, and black. Among them, white is preferred.

(6) Protective Film and Release Film or Release Paper

The retroreflective sheet in the form of a product preferably includes a protective film on the outer surface of the surface layer, and a release film or release paper on the outer surface of the adhesive layer. If the protective film is attached to the outer surface of the surface layer, the inner layers are protected, and the sheet is conveniently handled during attachment to a vehicle license plate. It is necessary to attach the release film or release paper to the outer surface of the adhesive layer.

The protective film is used to prevent scratches on the surface occurring during transportation, processing or the like, and for example a variety of commercially available resin films with a thickness of 30 to 90 μm can be used as the protective film. After a vehicle base plate to which a retroreflective sheet is attached is embossed, the protective film is removed and an ink layer of symbols is formed on the convex portions. Therefore, the protective film preferably has a property of following the retroreflective sheet during embossing.

The release film or release paper may be, e.g., a polyethylene terephthalate film (PET film) with a thickness of 25 to 50 μm, or a double-sided polyethylene treated paper with a thickness of 80 to 200 μm.

A method for producing the retroreflective sheet of the present invention includes the following processes.

(1) Forming a transparent vinyl chloride resin surface layer on the surface of a process base film by casting The process base film may be, e.g., a PET film with a thickness of 25 to 100 μm. For example, a transparent vinyl chloride resin solution is applied to a PET film (thickness: 50 μm) and dried by heating at 70° C. to 140° C. for 3 minutes to form a transparent vinyl chloride resin surface layer.

(2) Forming a printed layer or a partially printed layer on the transparent vinyl chloride resin surface layer by ink jet printing, gravure printing, screen printing, or offset printing (3) Forming a barrier layer containing an alkyd-melamine resin on the surfaces of the transparent vinyl chloride resin surface layer and the printed layer or partially printed layer by casting For example, an alkyd-melamine resin solution is applied thereto and dried by heating at 70° C. to 140° C. for 2 minutes to form an alkyd-melamine resin layer.

(4) Forming a glass bead holding layer including glass beads, which will be described later, on the alkyd-melamine resin barrier layer (5) Forming a metal reflective layer on the glass bead holding layer by vacuum vapor deposition (6) Forming an adhesive layer on a surface of a separately prepared release paper by casting For example, an adhesive solution is applied to a separately prepared release paper and dried by heating at 70° C. to 100° C. for 3 minutes to form an adhesive layer with a thickness of about 50 μm.

(7) Stacking the adhesive layer on the surface of the metal reflective layer (8) Removing the process base film Since the barrier layer, the glass bead holding layer and the adhesive layer are formed by casting, interlaminar bonding is high. Regarding the adhesive layer formation process, the above describes the case in which an adhesive layer is formed on a separately prepared release paper and then stacked on the surface of the metal reflective layer. Alternatively, an adhesive layer may be formed directly on the surface of the metal reflective layer and then a release paper may be attached to the adhesive layer.

Figure 1:
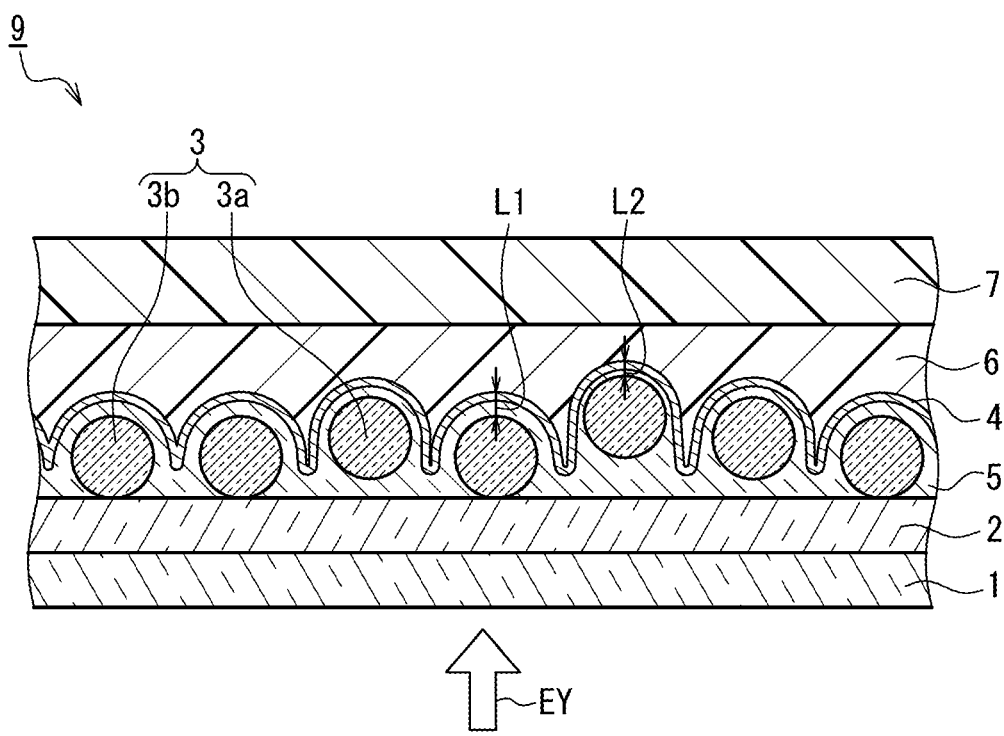
FIG. 1 is a schematic cross-sectional view of a retroreflective sheet in one embodiment of the present invention.

Hereinafter, the present disclosure will be described with reference to the drawings. In the drawings, the same reference numeral denotes the same component. FIG. 1 is a schematic cross-sectional view of a retroreflective sheet in one embodiment of the present invention. A retroreflective sheet 9 includes a surface layer 1, a glass bead holding layer 5 containing glass beads 3, and a metal reflective layer 4 on the back surface side of the glass bead holding layer 5. The glass beads 3 are located randomly as viewed cross-sectionally. The surface layer 1 is a vinyl chloride resin layer, and a barrier layer 2 is disposed between the surface layer 1 and the glass bead holding layer 5. An adhesive layer 6 and a release paper layer 7 are stacked on the back surface of the metal reflective layer 4. An arrow EY indicates a direction of external light incident from the front layer side.

Figure 2:
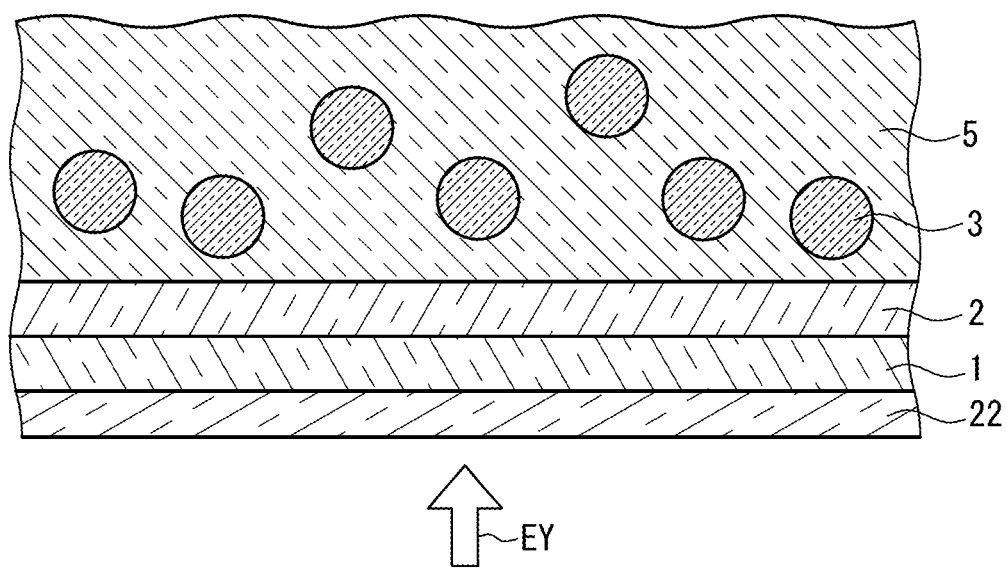
FIG. 2 is a schematic cross-sectional view illustrating a production process of the retroreflective sheet, showing a state in which a resin solution containing glass beads is applied to a surface of a barrier layer.
Figure 3:
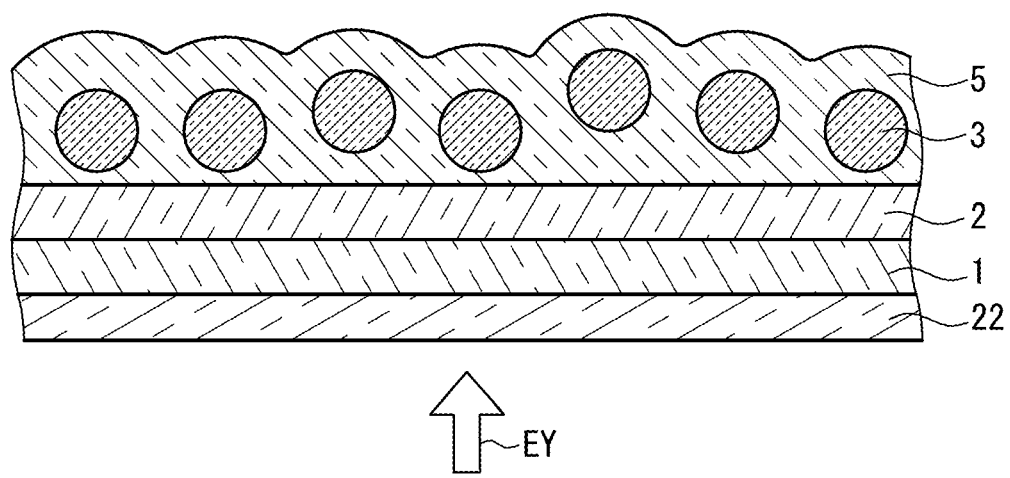
FIG. 3 is a schematic cross-sectional view of the same in the course of drying.
Figure 4:
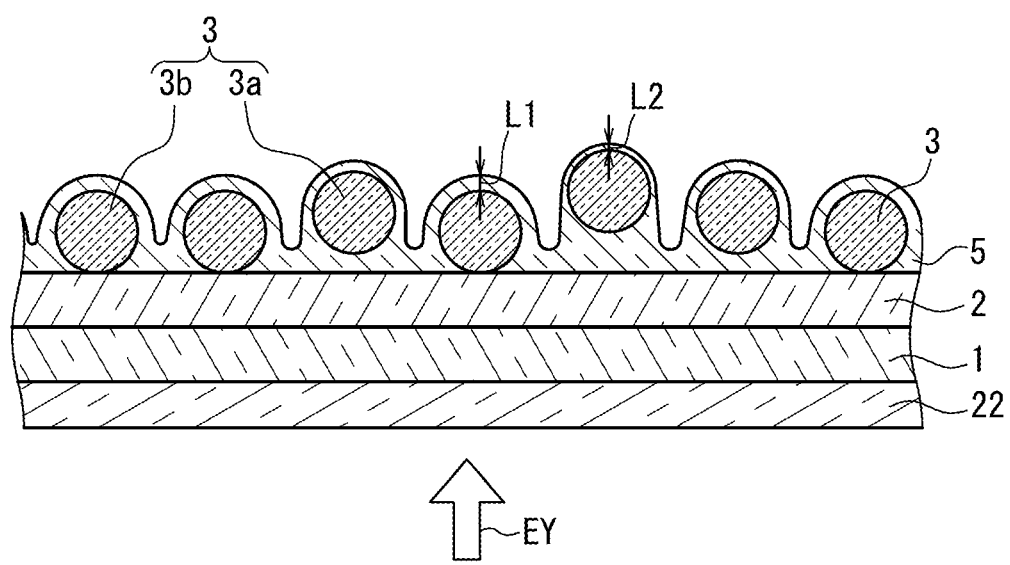
FIG. 4 is a schematic cross-sectional view of the same after drying.

FIGS. 2 to 6 are schematic cross-sectional views illustrating the production processes of the retroreflective sheet. FIG. 2 is a schematic cross-sectional view illustrating a state in which a resin solution containing the glass beads 3 is applied to a surface of the barrier layer 2. The coating is left at room temperature (25° C.) for a specific period of time to remove or burst any bubbles mixed in the coating solution. The solvent is volatilized in the heat drying process, during which time the glass beads 3 settle toward the barrier layer 2. Specifically, the glass bead holding layer resin solution containing the glass beads 3 is applied to the barrier layer 2 in a constant film thickness using a knife coater, comma coater, flow coater, or the like. A reference numeral 22 denotes a process base film. As shown in FIG. 3, the glass beads 3 are distributed randomly (irregularly) in the coated resin film (hereinafter also referred to as a "wet film"), and during heating the glass beads sequentially settle toward the barrier layer 2, starting with those closest to the barrier layer 2. As shown in FIG. 4, it is preferable to carry out resin curing of the glass bead holding layer 5 so as to fix the glass beads such that the settling of the glass beads stops when 50% to 90% by weight, preferably 55% to 85% by weight, more preferably 60% to 80% by weight of the glass beads out of the total glass beads come into contact with the barrier layer 2. The glass beads 3b that are in contact with the barrier layer 2 mainly play the role of maintaining the reflective performance at an observation angle of 0.2° to 2° and an incidence angle of 5° to less than 90°. The rest of glass beads 3a that are not in contact with the barrier layer 2 mainly play the role of maintaining the reflective performance at a larger observation angle of 2° to 4° and an incidence angle of 5° to less than 90°. As the method for adjusting the film thickness of the glass bead holding layer 5, the thickness of the glass bead holding layer 5 can be optimized by applying several thin coats of the glass bead holding layer resin solution to maximize the reflective performance at an observation angle of 0.2° and an incidence angle of 5° with respect to the glass beads 3b, but it is more preferable to preset the initial wet film thickness to form the glass bead holding layer 5 having an optimal thickness on the glass beads 3b.

In the drying and solidification process, as the solvent volatilizes, the resin solution of the glass bead holding layer 5 shrinks in volume such that the layer envelops the glass beads at locations where the glass beads 3 are present. Thereby, the resin is formed concentric to the glass beads.

A thickness L1 of the resin formed on the glass beads 3b in contact with the barrier layer 2 becomes large, and a thickness L2 of the glass beads 3a not in contact with the barrier layer 2 becomes smaller as they are distant from the barrier layer 2. The smaller the thickness L, the more the glass beads have wide-angle reflective performance even at a greater observation angle. Well-balanced wide-angle reflective performance is obtained by the various glass beads contained continuously.

The wet film thickness is appropriately adjusted to 6.5 to 8.5 times, preferably 6.7 to 8.3 times, and more preferably 7 to 8 times, the particle diameter of the glass beads. If the wet film thickness is less than 6.5 times, the time for adjusting 50% to 90% by weight of the glass beads to come into contact with the barrier layer is too short, which makes it difficult to control the positions of the glass beads to divide the reflective performance of the glass beads. If the wet film thickness exceeds 8.5 times, the time for adjusting 50% to 90% by weight of the glass beads to come into contact with the barrier layer is too long, which excessively increases the viscosity of the resin and hinders a glass bead holding layer from being formed concentric to the glass beads. Patent Document 3 details the reason why the wide-angle reflective performance is exhibited.

To obtain the optimum resin film thickness at the wet film thickness, the solid content of the resin solution is 15% to 25% by weight, preferably 16% to 24% by weight, and more preferably 17% to 23% by weight. If the solid content is less than 15% by weight, it is difficult to form resin concentric to the glass beads. If the solid content exceeds 25% by weight, it is difficult to finely adjust the resin film thickness and control the reflective performance.

The glass beads to be used herein contain titanium oxide, and the refractive index thereof is 2.10 to 2.40, preferably 2.15 to 2.35, and more preferably 2.20 to 2.30. The median diameter of the glass beads is 35 μm or more and 75 Ξm or less, and preferably 40 μm or more and 70 μm or less. If the median diameter is less than 35 μm, the desired reflective performance cannot be obtained. If it exceeds 75 μm, it is difficult to form a glass bead holding layer concentric to the glass beads.

The resin viscosity during coating is 500 to 3000 mPa·s, preferably 700 to 2800 mPa·s, and more preferably 900 to 2600 mPa·s. If the resin viscosity is less than 500 mPa·s, the glass beads dispersed in the resin solution drop too fast, which makes it difficult to control the positions of the glass beads. Further, the resin that runs down the sides of the glass beads from the top also moves too fast, and more resin accumulates around the bottom of the glass beads (on the barrier layer side), which hinders the resin from being formed concentric to the glass beads. If the resin viscosity exceeds 3000 mPa·s, the time for the glass beads to reach the barrier layer is too long, which further increases the viscosity of the resin solution. As a result, the glass beads cannot reach the barrier layer, and bubbles cannot be removed from the resin solution.

The polymerization degree of polyvinyl butyral resin that satisfies the above solid content and viscosity of the resin solution is 500 to 1500, preferably 600 to 1400, and more preferably 700 to 1300. If the polymerization degree is less than 500, the solid content of the resin solution becomes too high and it is difficult to adjust the film thickness. If the polymerization degree exceeds 1500, the solid content becomes too low and it is difficult to form resin concentrically.

Further, in terms of adjusting the curing speed with the curing agent, it is preferable that the polyvinyl alcohol unit of the polyvinyl butyral resin accounts for 17% by weight or more and 23% by weight or less.

Examples of the curing agent for promoting a crosslinking reaction with the hydroxyl group in the polyvinyl alcohol unit include amino resins, epoxy resins, polyisocyanates, and blocked polyisocyanates. Typically, a mixed solvent of an alcohol solvent and an aromatic solvent is often used as a solvent for dissolving the polyvinyl butyral resin. When the alcohol solvent is used, polyisocyanates or blocked polyisocyanates are undesirable because they adversely affect reactivity, whereas amino resins are preferred. Being insoluble in various solvents, such as in toluene for 1 minute, in xylene for 1 minute and in methanol for 10 minutes, after completion of curing reaction makes a retroreflective sheet suitable for practical use because inks such as screen inks, which contain different kinds of organic solvents, can be used for printing, and the product will be resistant to gasoline when applied to a vehicle or the like.

The glass transition point (Tg) of the polyvinyl butyral resin is preferably 60° C. or higher and 80° C. or lower. If Tg is lower than 60° C., the heat resistance will be too low during formation of the glass bead holding layer on the glass beads and resin will flow, which makes it difficult to form the glass bead holding layer concentric to the glass beads. If Tg exceeds 80° C., the heat resistance will be too high and the flow of resin will be retarded during heat drying, which makes it difficult to form the glass bead holding layer concentric to the glass beads.

In the resin solution in which the glass beads are dispersed, the mixing ratio of the resin solid weight and the glass bead weight is adjusted suitably so that the glass bead weight accounts for preferably 0.8 to 3.0, more preferably 1.0 to 2.8, and further preferably 1.2 to 2.6 based on 1 of the resin weight. If the glass bead weight is less than 0.8, satisfactory reflective performance cannot be obtained. If the glass bead weight exceeds 3.0, there will be no space between the beads, which makes it difficult to control the positions of the glass beads in a balanced manner to divide the reflective performance of the glass beads.

Air trapped in the resin solution during processing such as mixing of the glass beads forms bubbles. To eliminate such bubbles shortly after application of the resin solution to the barrier layer, an antifoaming agent is appropriately added. A non-silicon-based antifoaming agent is preferred in order not to hinder the adhesion with the metal reflective layer, which is formed in the subsequent process, and it is more preferred that the amount of the non-silicon-based antifoaming agent to be added is 0.01 to 3.0% by weight of the resin weight. Among the non-silicon-based antifoaming agents, an alkyl vinyl ether copolymer is preferred, and it is particularly favorable that an alkyl vinyl ether copolymer is added in an amount of 0.02 to 2.0% by weight of the resin weight to obtain a sufficient antifoaming effect and not to hinder adhesion with the metal reflective layer.

Figure 5:
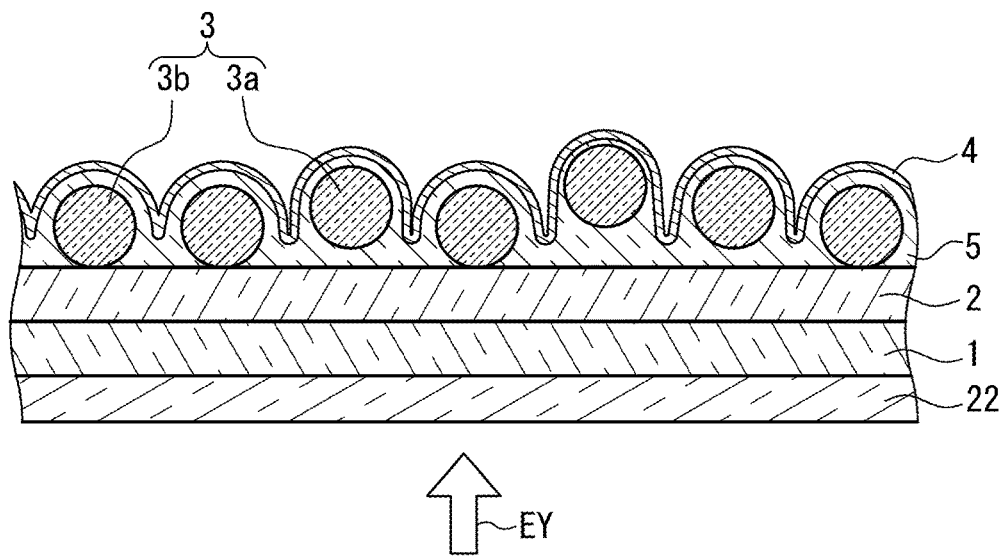
FIG. 5 is a schematic cross-sectional view illustrating a state in which the glass beads are located randomly, and a metal reflective film is formed on the resin on the surface of the glass beads.
Figure 6:
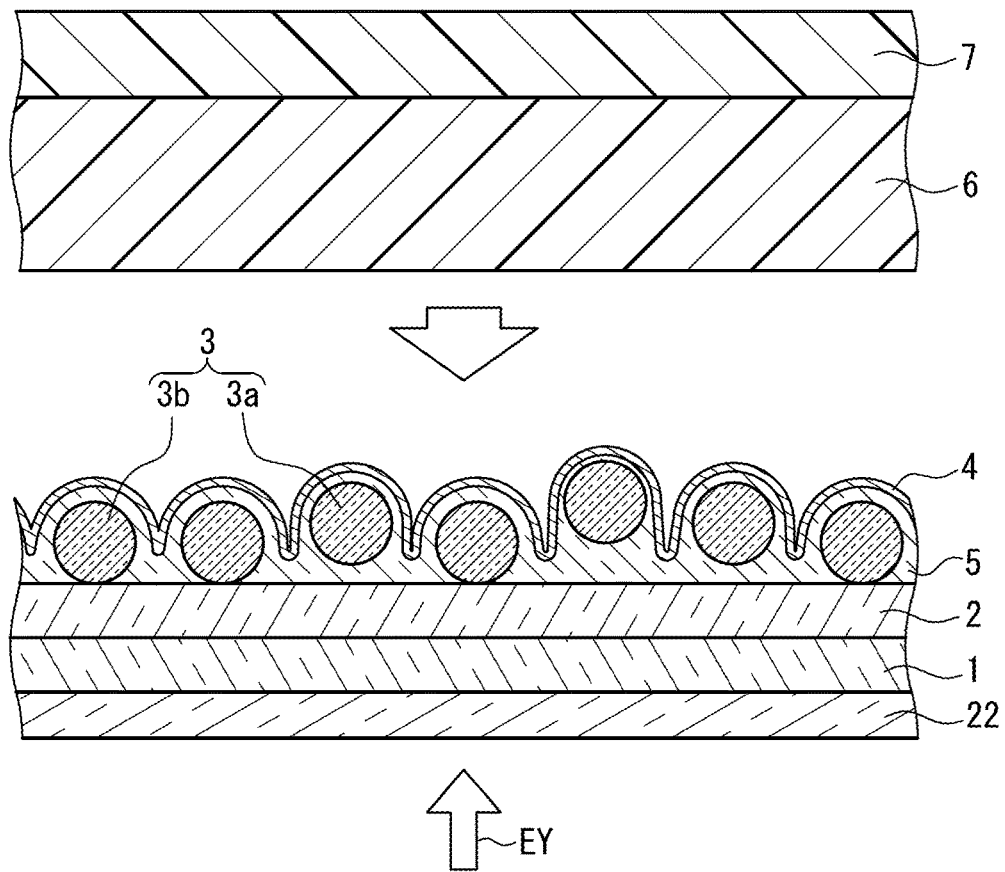
FIG. 6 is a schematic cross-sectional view illustrating a process of stacking an adhesive layer and a release film or release paper on the metal reflective

Next, as illustrated in FIG. 5, the metal reflective layer 4 of aluminum or the like is formed along the glass bead holding layer 5 on the surface of the glass bead holding layer 5. The metal reflective layer 4 can be formed by vapor deposition of aluminum, for example. The metal reflective layer 4 has a thickness of preferably 5 to 200 nm, and more preferably 10 to 100 nm. Next, as illustrated in FIG. 6, the adhesive layer 6 formed in advance on the release paper 7 is pressed on the metal reflective layer 4 and unified therewith to form a retroreflective sheet of FIG. 1.

Figure 7:
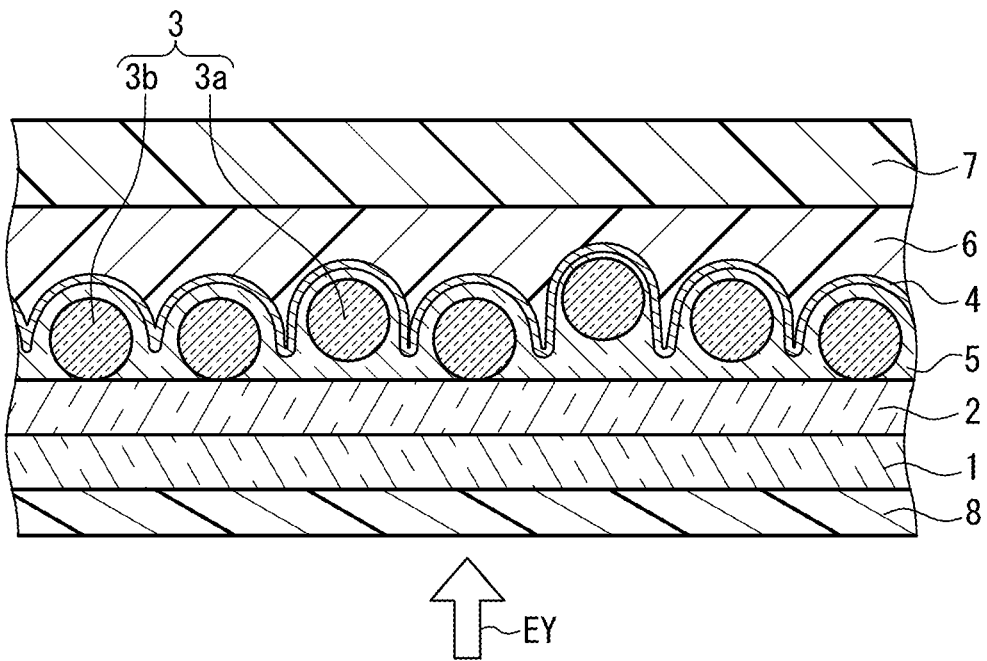
FIG. 7 is a schematic cross-sectional view illustrating a state in which a protective film is stacked on the surface layer.

FIG. 7 is a schematic cross-sectional view illustrating a state in which the protective film 8 is stacked on the surface layer. This is a product form of the retroreflective sheet in the case of attaching the surface protective film. The surface protective film is attached to a vehicle license plate and removed before transfer printing of symbols, etc.

Figure 8:
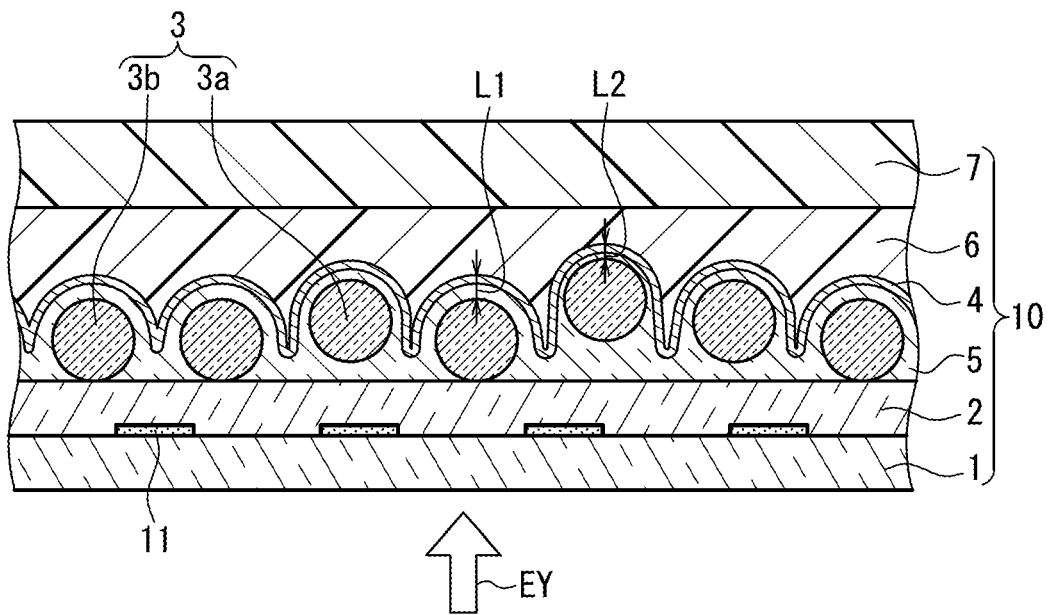
FIG. 8 is a schematic cross-sectional view in which a printed layer is disposed between the surface layer and the barrier layer.
Figure 9:
FIG. 9 is a schematic front view of a license plate, which is produced by attaching a retroreflective sheet to a vehicle base plate, embossing the vehicle base plate to which the retroreflective sheet is attached, and forming a symbol ink layer on the convex portions.

FIG. 8 is a schematic cross-sectional view in which a printed layer 11 is disposed between the surface layer 1 and the barrier layer 2. The printed layer 11 may have any pattern as illustrated in FIG. 9. FIG. 9 is a schematic front view of a license plate 14, which is produced by attaching a retroreflective sheet to a vehicle base plate, embossing it, and forming a symbol ink layer 23 on the convex portions. The printed layer 11 illustrated herein is a partially printed layer on which Mt. Fuji and a cherry flower are graphically printed. The Mt. Fuji design in the middle may be moved to a position so as not to interfere with the numbers. The cherry flower design on the upper right may be any emblem design.

Figure 10:
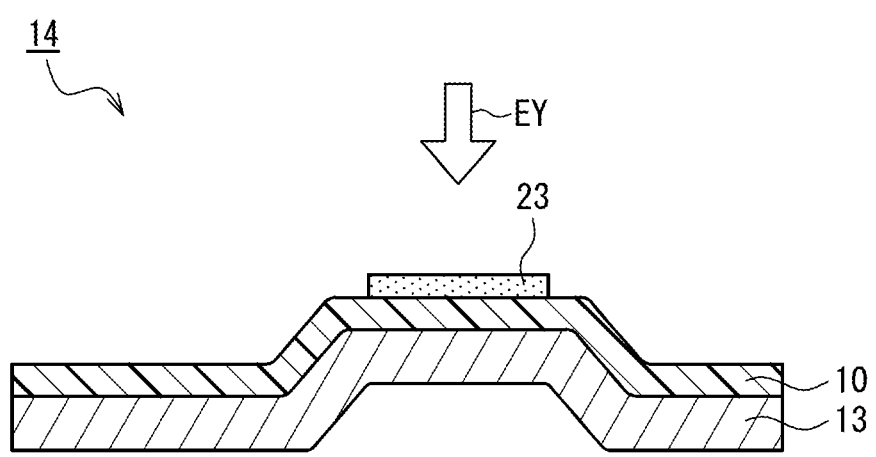
FIG. 10 is a schematic partial cross-sectional view of FIG. 9.

FIG. 10 is a schematic partial cross-sectional view of FIG. 9. A base plate 13 to which a retroreflective sheet body 10 is adhered is embossed to form convex portions, on which an ink is thermally transferred to print a vehicle number 12. Other than the thermal transfer printing, the printed layer may be formed by roll coating printing, ink jet printing, gravure printing, screen printing, or offset printing.

Figure 11:
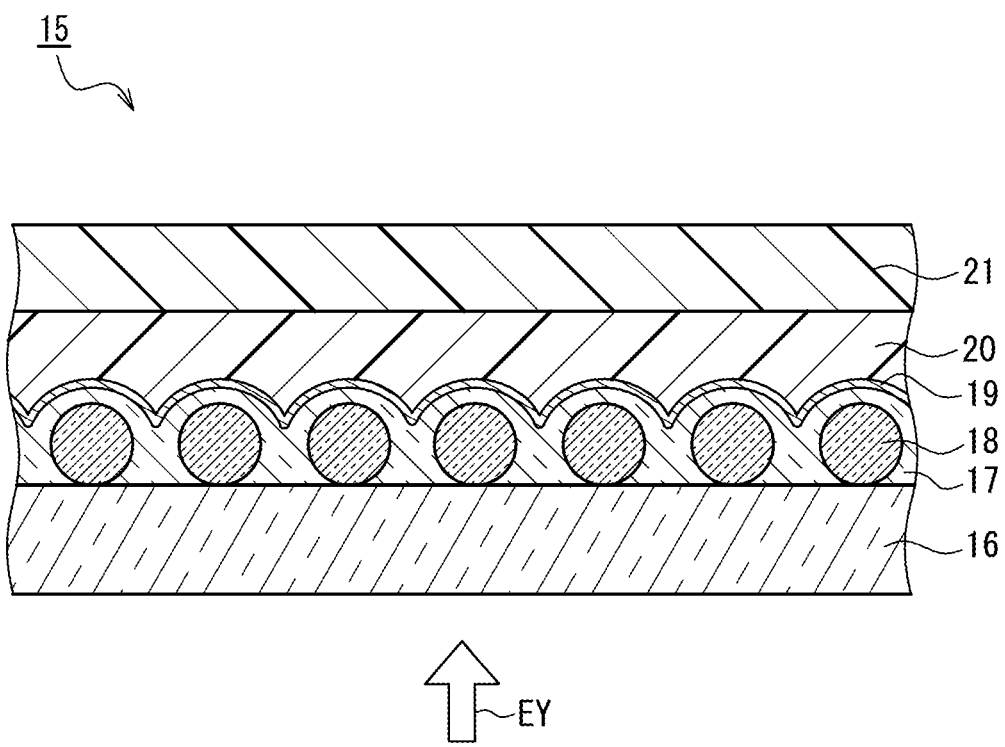
FIG. 11 is a schematic cross-sectional view of a retroreflective sheet of a comparative example.

FIG. 11 is a schematic cross-sectional view of a retroreflective sheet 15 of a comparative example (conventional technique). The retroreflective sheet 15 includes a surface layer 16, a glass bead holding layer 17 in which glass beads 18 are arrayed in a row, which is located on the inner side of the surface layer 16, a metal reflective layer 19 on the back surface side of the glass bead holding layer 17, and an adhesive layer 20 and a release paper 21 stacked on the back surface of the metal reflective layer 19.

EXAMPLES

Hereinafter, the present invention will be described in more detail by way of examples. However, the present invention is not limited to the examples. In the following examples, "part" represents "part by mass" and "%" represents "mass %" unless otherwise specified.

The following measurement methods and evaluations were conducted for retroreflective sheets of Examples and Comparative Examples.

Weather Resistance

An ultraviolet fluorescent lamp accelerated weathering test was performed.
Tester: UVCON manufactured by ATLAS MATERIAL TESTING TECHNOLOGY GMBH
2000-hour measurement in accordance with JIS K5600-7-8
Measuring reflection coefficients at an observation angle of 0.2° and an incidence angle of 5° before and after the test
The larger the reflection coefficient, the better the weather resistance.

Printability

Test method: Thermal transfer (hot stamping) printing
Tester: Thermal transfer (hot stamping) printer manufactured by ERICH UTSCH AG
Transfer foil: "M720655-N" (trade name) manufactured by LEONHARD KRUZ STIFTUNG & CO. KG
Evaluation method
(1) Performing thermal transfer printing with the printing temperature varying per 10° C.
(2) Attaching an adhesive tape (No. 252 manufacture by SEKISUI CHEMICAL CO., LTD.) to a transfer printed surface and pressing the tape with fingers so that the tape sufficiently adheres to the transfer printed surface
(3) Unsticking the adhesive tape in the 60° direction within 0.5 to 1.0 seconds
(4) Observing the printed surface after removal of the adhesive tape, and recording a temperature at which peeling, deficiency and the like do not occur in the printed surface
(5) The lower the printing temperature, the better the printability. The printing temperature of 180° C. or lower is preferred.

Wide-Angle Reflectivity

"A" represents a narrow angle (observation angle: 0.2°, incidence angle: 5°) reflection coefficient, and "B" represents a wide angle (observation angle: 0.2°, incidence angle: 45°) reflection coefficient.
The wide-angle reflectivity is evaluated with Formula: B/A× 100(%). The larger the number, the higher the wide-angle reflectivity

Reflection Coefficient>

The reflection coefficient is a value measured in accordance with JIS Z 9117 (2011), and it is a quotient obtained by dividing a luminous intensity (I) produced by the retroreflective surface toward an observation angle direction, by a product of an illuminance (Es) received by the retroreflective surface disposed vertically to the direction of incident light and its area (A).
Retroreflective coefficient R'=I/(Es·A)
The unit is expressed by $cd \cdot lx^{-1} \cdot m^{-2}$.

Example 1

<Surface Layer>
A transparent vinyl chloride resin solution described below was applied to a PET film (50-μm -thick process film) and dried by heating at 70° C. for 1 minute, at 100° C. for 1 minute and at 140° C. for 3 minutes to form a surface layer with a thickness of 40 μm.
(Composition of Vinyl Chloride Resin Solution)
(1) Vinyl chloride resin solution (ethylene-vinyl chloride copolymer, glass transition temperature: 81° C., solid content: 17%) 80 parts
(2) Ethylene acrylate ester type terpolymer resin solution (solid content: 25%) 12 parts
(3) Urethane resin "BURNOCK D7-821-50" (trade name) [manufactured by DIC CORPORATION] (solid content: 50%) 3.8 parts
(4) Polyester plasticizer "POLYCIZER W-360-ELS" (trade name) [manufactured by DIC CORPORATION] (solid content: 100%) 1.1 parts
(5) Ba/Zn PVC stabilizer "ADK STAB AC-118" (trade name) [manufactured by ADEKA CORPORATION] 0.5 parts
(6) Ba PVC stabilizer "ADK STAB CPL-37" (trade name) [manufactured by ADEKA CORPORATION] 0.06 parts
(7) Ultraviolet absorber "Tinuvin 326" (trade name) [manufactured by BASF JAPAN, Ltd.] 0.3 parts
(8) Antioxidant "Sumilizer GA-80" (trade name) [manufactured by Sumitomo Chemical Co., Ltd.] 0.2 parts
(9) Light stabilizer "SUNSORB LS-292" (trade name) [manufactured by SIN HUN CHEMICAL CO., LTD.] 0.06 parts
(10) Ultraviolet absorber "Uvinul 3039" (trade name) [manufactured by BASF JAPAN, Ltd.] 0.6 parts <Barrier Layer>
A transparent alkyd-melamine resin solution described below was applied to the transparent vinyl chloride resin surface layer and dried by heating at 70° C. for 1 minute and at 140° C. for 2 minutes to form a transparent alkyd-melamine resin layer with a thickness of 13 μm.
(Composition of Transparent Alkyd-Melamine Resin Solution)
(1) Alkyd resin solution "BECKOLITE CF-743-50" (trade name) [manufactured by DIC CORPORATION] (solid content: 50%) 46.0 parts
(2) Vinyl chloride-vinyl acetate copolymer resin solution (solid content: 25%) 27.0 parts
(3) Leveling agent (solid content: 0.05%) 0.06 parts
(4) Plasticizer "POLYCIZER W-2310" (trade name) [manufactured by DIC CORPORATION] (solid content: 99%) 1.3 parts
(5) Epoxidized product of fatty acid glyceride "A-130P" (trade name) [manufactured by ADEKA CORPORATION] (solid content: 100%) 0.3 parts
(6) Antioxidant "EVERNOX-10" (trade name) [manufactured by EVERSPRING CHEMICAL CO., LTD.] (solid content: 100%) 0.15 parts
(7) Ultraviolet absorber "ZISLIZER E" (trade name) [manufactured by SANKYO KASEI CO., LTD.] (solid content: 100%) 1.1 parts
(8) Methylated melamine resin (solid content: 60%) 8.4 parts
(9) Butylated melamine resin (solid content: 60%) 4.2 parts
(10) Alkyl acid phosphate ester (solid content: 60%) 0.15 parts <Glass Bead Holding Layer>
A glass sphere-dispersed resin solution described below was applied as a glass bead holding layer to the barrier layer.
(1) Polyvinyl butyral resin solution (polymerization degree: 680, polyvinyl alcohol unit: 23% by weight, glass transition point: 66° C., solid content: 21%, n-butanolltoluene: 1:1) 75.0 parts
(2) Amino resin "AMIDIR P-138" (trade name) [manufactured by DIC CORPORATION] 1.2 parts
(3) Alkyl acid phosphate ester (solid content: 60%) 0.015 parts
(4) Antifoaming agent "BYK-052" (trade name) [manufactured by BYK Japan KK] 0.02 parts
(5) Silane coupling agent "Z-6043" (trade name) [manufactured by DOW CORNING TORAY Co., Ltd.] 0.3 parts
(6) Plasticizer "SANSO CIZER DIDP" (trade name) [manufactured by New Japan Chemical Co., Ltd.] 4.5 parts (7) Antioxidant "EVERNOX-10" (trade name) [manufactured by EVERSPRING CHEMICAL CO., LTD.] (solid content: 100%) 0.2 parts
(8) Ultraviolet absorber "VIOSORB 80" (trade name) [manufactured by KYODO CHEMICAL CO., LTD.] 0.1 parts
(9) Xylene 9.5 parts
(10) n-Butanol 9.5 parts
(11) Glass spheres (median diameter: 50 μm, 90% or more of the glass spheres having a median diameter within 50±10 μm, refractive index: 2.18±0.02) 29.0 parts The viscosity during application of the above blended resin coating (excluding the glass spheres) was 1500 mPa·s.

The glass sphere-dispersed resin solution was applied to the surface of the barrier layer while adjusting the wet film thickness so that the metal reflective layer would be formed at the focusing position of the glass spheres in contact with the barrier layer.

After this, the coating was dried by heating for about 1 minute at normal temperature, at 70° C. for 1 minute and at 100° C. for 30 seconds, and further at 140° C. for 4 minutes to cure the glass bead holding layer resin.

<Metal Reflective Layer>

Next, aluminum was applied to the glass bead holding layer as a metal reflective layer by vacuum vapor deposition so that the film thickness would be 80 nm.

<Adhesive Layer>

A white adhesive solution described below was applied to a separately prepared release paper (thickness: about 150 μm) and dried by heating at 70° C. for 1 minute and at 100° C. for 2 minutes to form a white adhesive layer with a thickness of about 50 μm. Thereafter, the metal reflective layer and the white adhesive layer were stacked together to form a retroreflective sheet body.

(Composition of White Adhesive Solution)
(1) Acrylic resin "ACRYSET AST-8207" (trade name) [manufactured by NIPPON SHOKUBAI CO., LTD.] (solid content: 35%) 100 parts
(2) Ethyl acetate 10 parts
(3) Titanium oxide "Titanium paste E" (trade name) [manufactured by NIPPON SHOKUBAI CO., LTD.] 2.5 parts
(4) Modified polyisocyanate resin "Coronate L-55E" (trade name) [manufactured by TOSOH CORPORATION] 1.5 parts <Retroreflective Sheet>

Table 1 shows the evaluation results of the retroreflective sheet obtained in the above-described manner.

Examples 2 to 5

Retroreflective sheets of Examples 2-5 were produced in the same manner as in Example 1 except for the thicknesses of the surface layer and the barrier layer. Table 1 shows the evaluation results.

Example 6

A retroreflective sheet of Example 6 was produced in the same manner as in Example 1 except that the surface layer was formed by applying the resin solution to have a dry thickness of 60 μm, through drying at 70° C. for 3 minutes, at 100° C. for 1 minute and at 140° C. for 3 minutes, and the barrier layer was formed by applying the resin solution to have a dry thickness of 55 μm, through drying at 70° C. for 2 minutes, at 100° C. for 1 minute and at 140° C. for 2 minutes. Table 1 shows the evaluation results.

Comparative Example 1

A retroreflective sheet of Comparative Example 1 was produced in the same manner as in Example 1 except that a vinyl chloride resin (film thickness: 40 μm) was used as the surface layer, and no barrier layer was provided. Table 2 shows the evaluation results.

Comparative Example 2

A retroreflective sheet of Comparative Example 2 was produced in the same manner as in Example 1 except that a transparent polycarbonate urethane resin layer prepared as follows was used as the surface layer. A transparent polycarbonate urethane resin solution described below was applied and dried by heating at 70° C. for 1 minute, at 100° C. for 1 minute, and at 140° C. for 1 minute to form a transparent polycarbonate urethane resin surface layer with a thickness of 15 μm.

<Composition of Transparent Polycarbonate Urethane Resin Solution>
(1) Polycarbonate urethane solution (solid content: 30%) 80.0 parts
(2) Polymer ultraviolet absorber "XL07-0016" (trade name) [manufactured by Lion Specialty Chemicals Co., Ltd.] (solid content: 32%) 20 parts
(3) Urethane resin "SN-THICKENER A-812" (trade name) [manufactured by SAN NOPCO LIMITED] (solid content: 100%) 0.2 parts
(4) Silicon resin "OLFINE E-1004" (trade name) [manufactured by Nissin Chemical Industry Co., Ltd.] (solid content: 100%) 0.5 parts Table 2 shows the evaluation results.

Comparative Example 3

A retroreflective sheet of Comparative Example 3 was produced in the same manner as in Example 1 except that a vinyl chloride resin (film thickness: 40 μm) was used as the surface layer, no barrier layer was provided, and glass beads were dispersed in a row as illustrated in FIG. 11. Table 2 shows the evaluation results.

Comparative Example 4

A retroreflective sheet of Comparative Example 4 was produced in the same manner as in Example 1 except that a vinyl chloride resin (film thickness: 20 μm) was used as the surface layer, and the thickness of the barrier layer was 13 μm. Table 2 shows the evaluation results.

TABLE 1

|  |  | Example 1 | Example 2 | Example 3 | Example 4 | Example 5 | Example 6 |
|---|---|---|---|---|---|---|---|
| Glass beads | Arrangement method | Kneading | Kneading | Kneading | Kneading | Kneading | Kneading |
|  | Arranged state | Random | Random | Random | Random | Random | Random |

TABLE 1-continued

|  |  | Example 1 | Example 2 | Example 3 | Example 4 | Example 5 | Example 6 |
|---|---|---|---|---|---|---|---|
| Surface layer | Resin | Vinyl chloride | Vinyl chloride | Vinyl chloride | Vinyl chloride | Vinyl chloride | Vinyl chloride |
|  | Film thickness (μm) | 40 | 27 | 40 | 27 | 20 | 60 |
| Barrier layer | Resin | Alkyd-melamine | Alkyd-melamine | Alkyd-melamine | Alkyd-melamine | Alkyd-melamine | Alkyd-melamine |
|  | Film thickness (μm) | 13 | 13 | 30 | 30 | 30 | 55 |
| Total thickness of surface layer and barrier layer (μm) |  | 53 | 40 | 70 | 57 | 50 | 115 |
| Weather resistance, 2000 hours |  | 46 | 50 | 47 | 49 | 40 | 51 |
| Printing temperature (° C.) |  | 160 | 160 | 160 | 160 | 170 | 160 |
| Wide-angle reflectivity (%) |  | 36 | 30 | 35 | 35 | 34 | 33 |

TABLE 2

|  |  | Comparative Example 1 | Comparative Example 2 | Comparative Example 3 | Comparative Example 4 |
|---|---|---|---|---|---|
| Glass beads | Arrangement method | Kneading | Kneading | Dispersion | Kneading |
|  | Arranged state | Random | Random | In a row | Random |
| Surface layer | Resin | Vinyl chloride | Urethane | Vinyl chloride | Vinyl chloride |
|  | Film thickness (μm) | 40 | 15 | 40 | 20 |
| Barrier layer | Resin | Not provided | Alkyd-melamine | Not provided | Alkyd-melamine |
|  | Film thickness (μm) | — | 13 | — | 13 |
| Total thickness of surface layer and barrier layer (μm) |  | 40 | 28 | 40 | 33 |
| Weather resistance, 2000 hours |  | 9 | 41 | 37 | 25 |
| Printing temperature (° C.) |  | 170 | 200 | 170 | 160 |
| Wide-angle reflectivity (%) |  | 28 | 42 | 12 | 35 |

As described above, the retroreflective sheets of Examples of the present invention maintained high weather resistance and had good surface printability and wide-angle reflectivity. Meanwhile, the retroreflective sheet of Comparative Example 1 resulted in poor weather resistance because no barrier layer was provided and the sheet was not thick enough. The retroreflective sheet of Comparative Example 2 resulted in poor printability because the surface layer was urethane resin. The retroreflective sheet of Comparative Example 3 resulted in low wide-angle reflectivity because the glass beads were arrayed in a row. Although the barrier layer was provided, the retroreflective sheet of Comparative Example 4 resulted in poor weather resistance because the total thickness of the surface layer and the barrier layer was thin.

INDUSTRIAL APPLICABILITY

The retroreflective sheet of the present invention is suitably used for vehicle license plates, and also for traditional road signs and traffic signs, graphic sheets, guide signs, advertising boards, fleet marking for promotional activities by wrapping the sheet with an advertisement around a vehicle and driving the vehicle around the city, and the like.

1, 16 Surface layer
2 Barrier layer
3, 3a, 3b, 18 Glass beads
4, 19 Metal reflective layer
5, 17 Glass bead holding layer
6, 20 Adhesive layer
7, 21 Release paper layer
8 Protective film
9, 15 Retroreflective sheet
10 Retroreflective sheet body
11 Printed layer
12 Vehicle number
13 Base plate
22 Process base film
EY Incident direction of external light
14 License plate
23 Symbol ink layer

The invention claimed is:
1. A retroreflective sheet comprising:
a surface layer;
a glass bead holding layer comprising glass beads that are located randomly as viewed cross-sectionally; and
a metal reflective layer on a back surface side of the glass bead holding layer,
wherein the surface layer is a vinyl chloride resin layer, the retroreflective sheet further comprises between the vinyl chloride resin layer and the glass bead holding layer a barrier layer for preventing deterioration of the metal reflective layer.

2. The retroreflective sheet according to claim 1, wherein the barrier layer comprises a composition comprising: a resin component comprising at least one of alkyd resin, polyester resin, polyurethane resin, vinyl resin, or acrylic resin having a reactive functional group; and at least one of a curing agent or a curing catalyst comprising at least one of amino resin, epoxy resin, polyisocyanate, or blocked polyisocyanate.

3. The retroreflective sheet according to claim 1, wherein the barrier layer comprises a composition comprising an alkyd-melamine resin.

4. The retroreflective sheet according to claim 1, wherein the barrier layer has a thickness of 20 μm or more.

5. The retroreflective sheet according to claim 1, wherein the vinyl chloride resin layer has a thickness of 10 μm or more.

6. The retroreflective sheet according to claim 1, wherein a total thickness of the vinyl chloride resin layer and the barrier layer is 30 μm to 120 μm.

7. The retroreflective sheet according to claim 1, wherein the vinyl chloride resin layer has heat resistance that can withstand a thermal transfer printing temperature ranging from 120° C. to 200° C.

8. The retroreflective sheet according to claim 1, wherein the vinyl chloride resin layer comprises at least one of a plasticizer, an ultraviolet absorber, a heat stabilizer, a light stabilizer, an antioxidant, or a printing additive.

9. The retroreflective sheet according to claim 1, wherein the barrier layer comprises at least one of a plasticizer, an ultraviolet absorber, a heat stabilizer, a light stabilizer, or an antioxidant.

10. The retroreflective sheet according to claim 1, wherein at least one of the vinyl chloride resin layer or the barrier layer is colored.

11. The retroreflective sheet according to claim 1, further comprising a printed layer or a partially printed layer between the vinyl chloride resin layer and the barrier layer.

12. The retroreflective sheet according to claim 11, wherein the printed layer or the partially printed layer is formed by ink jet printing, gravure printing, screen printing, or offset printing.

13. The retroreflective sheet according to claim 1, wherein the retroreflective sheet has a brightness retention rate of 80% or more according to a 2000-hour test of an ultraviolet fluorescent lamp accelerated light resistance test.

14. The retroreflective sheet according to claim 1, wherein the glass bead holding layer comprises as a base polymer component at least one of polyvinyl acetal resin, polyurethane resin, acrylic resin, or polyester resin.

15. The retroreflective sheet according to claim 1, wherein the glass bead holding layer comprises as a curing agent at least one of amino resin, epoxy resin, polyisocyanate, or blocked polyisocyanate.

16. The retroreflective sheet according to claim 1, further comprising a protective film on an outer surface of the surface layer, and an adhesive layer below the glass bead holding layer and a release film or release paper on an outer surface of the adhesive layer.

17. The retroreflective sheet according to claim 1, further comprising a printed layer on the surface layer.

18. The retroreflective sheet according to claim 17, wherein the printed layer is formed by thermal transfer printing, roll coating printing, ink jet printing, gravure printing, screen printing, or offset printing.

19. The retroreflective sheet according to claim 1, wherein the retroreflective sheet is a sheet for a vehicle license plate.

20. The retroreflective sheet according to claim 1, wherein the retroreflective sheet is a sheet for a road sign, a sheet for a traffic sign, a sheet for a guide sign, a sheet for an advertising board, a sheet for a graphic sheet, or a sheet for fleet marking.

* * * * *